United States Patent
Walker et al.

(10) Patent No.: US 8,584,140 B2
(45) Date of Patent: Nov. 12, 2013

(54) SYSTEMS AND METHODS FOR RECEIVING AND SENDING MESSAGES ABOUT CHANGES TO DATA ATTRIBUTES

(75) Inventors: Douglas Jock Walker, Springville, UT (US); Reinier Van Ommeren, Midvale, UT (US)

(73) Assignee: PresenceID, Inc., Salt Lake City, UT (US)

( * ) Notice: Subject to any disclaimer, the term of this patent is extended or adjusted under 35 U.S.C. 154(b) by 1144 days.

(21) Appl. No.: 12/234,256

(22) Filed: Sep. 19, 2008

(65) Prior Publication Data

US 2009/0183175 A1 Jul. 16, 2009

Related U.S. Application Data

(60) Provisional application No. 60/974,223, filed on Sep. 21, 2007.

(51) Int. Cl.
*G06F 13/00* (2006.01)

(52) U.S. Cl.
USPC ........... 719/313; 719/315; 719/316; 719/317; 707/600; 707/602; 707/607; 707/609; 707/610

(58) Field of Classification Search
None
See application file for complete search history.

(56) References Cited

U.S. PATENT DOCUMENTS

| | | | | |
|---|---|---|---|---|
| 5,499,371 A | * | 3/1996 | Henninger et al. | 717/108 |
| 5,740,433 A | * | 4/1998 | Carr et al. | 707/610 |
| 5,848,415 A | * | 12/1998 | Guck | 707/831 |
| 5,870,765 A | * | 2/1999 | Bauer et al. | 707/610 |
| 5,913,213 A | * | 6/1999 | Wikstrom et al. | 707/610 |
| 6,463,439 B1 | * | 10/2002 | Dahlberg | 707/624 |
| 6,631,363 B1 | * | 10/2003 | Brown et al. | 719/318 |
| 6,810,405 B1 | * | 10/2004 | LaRue et al. | 707/613 |
| 6,847,974 B2 | | 1/2005 | Wachtel | |
| 6,925,477 B1 | * | 8/2005 | Champagne et al. | 707/610 |
| 7,069,269 B2 | * | 6/2006 | Morris | 707/810 |
| 7,562,102 B1 | * | 7/2009 | Sumner et al. | 1/1 |
| 7,716,257 B2 | * | 5/2010 | Thomson et al. | 707/809 |
| 7,730,028 B2 | * | 6/2010 | Tysowski et al. | 707/610 |
| 7,739,228 B1 | * | 6/2010 | Erickson et al. | 707/602 |
| 7,743,019 B2 | * | 6/2010 | Shah et al. | 707/610 |
| 7,752,166 B2 | * | 7/2010 | Quinlan et al. | 707/613 |
| 7,774,300 B2 | * | 8/2010 | Hsiao et al. | 707/602 |
| 2001/0048728 A1 | * | 12/2001 | Peng | 375/354 |
| 2002/0091702 A1 | * | 7/2002 | Mullins | 707/100 |
| 2003/0225742 A1 | * | 12/2003 | Tenner et al. | 707/2 |
| 2004/0034615 A1 | * | 2/2004 | Thomson et al. | 707/1 |
| 2004/0064484 A1 | * | 4/2004 | Polan et al. | 707/200 |
| 2004/0186842 A1 | * | 9/2004 | Wesemann | 707/100 |
| 2004/0243539 A1 | * | 12/2004 | Skurtovich et al. | 707/1 |
| 2005/0075996 A1 | * | 4/2005 | Dettinger et al. | 707/1 |
| 2005/0108680 A1 | * | 5/2005 | Cheng et al. | 717/104 |

(Continued)

*Primary Examiner* — Lechi Truong
*Assistant Examiner* — Shih-Wei Kraft
(74) *Attorney, Agent, or Firm* — Austin Rapp & Hardman

(57) ABSTRACT

Systems and methods for receiving and sending messages about changes to data attributes are described. A message that includes all common data attributes associated with a first reference object is received. The data attributes in the message are mapped to common data attributes in a second reference object. The type of the message is determined, where the message is either a synchronization message or a key change message. The common data attributes in the second reference object are updated to match the common data attributes in the first reference object if the message is a synchronization message. A unique data attribute in the second reference object is updated if the message is a key change message.

16 Claims, 12 Drawing Sheets

(56) References Cited

U.S. PATENT DOCUMENTS

| | | |
|---|---|---|
| 2005/0216524 A1 | 9/2005 | Gomes et al. |
| 2006/0031225 A1* | 2/2006 | Palmeri et al. .................. 707/10 |
| 2006/0167856 A1* | 7/2006 | Angele et al. ..................... 707/3 |
| 2006/0224638 A1* | 10/2006 | Wald et al. .................... 707/200 |
| 2007/0016596 A1* | 1/2007 | Fabret et al. .................. 707/100 |
| 2007/0220089 A1 | 9/2007 | Aegerter |
| 2008/0104008 A1* | 5/2008 | Brantley et al. ................... 707/1 |
| 2008/0270481 A1* | 10/2008 | Augustine .................... 707/200 |
| 2009/0037488 A1* | 2/2009 | Abrams ....................... 707/201 |

* cited by examiner

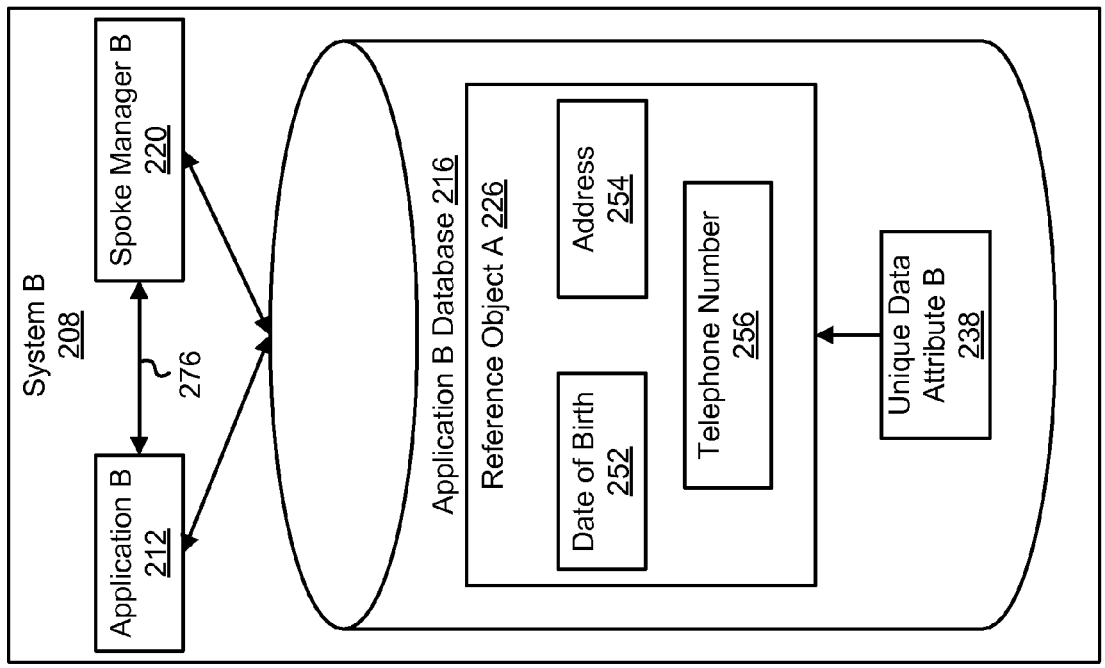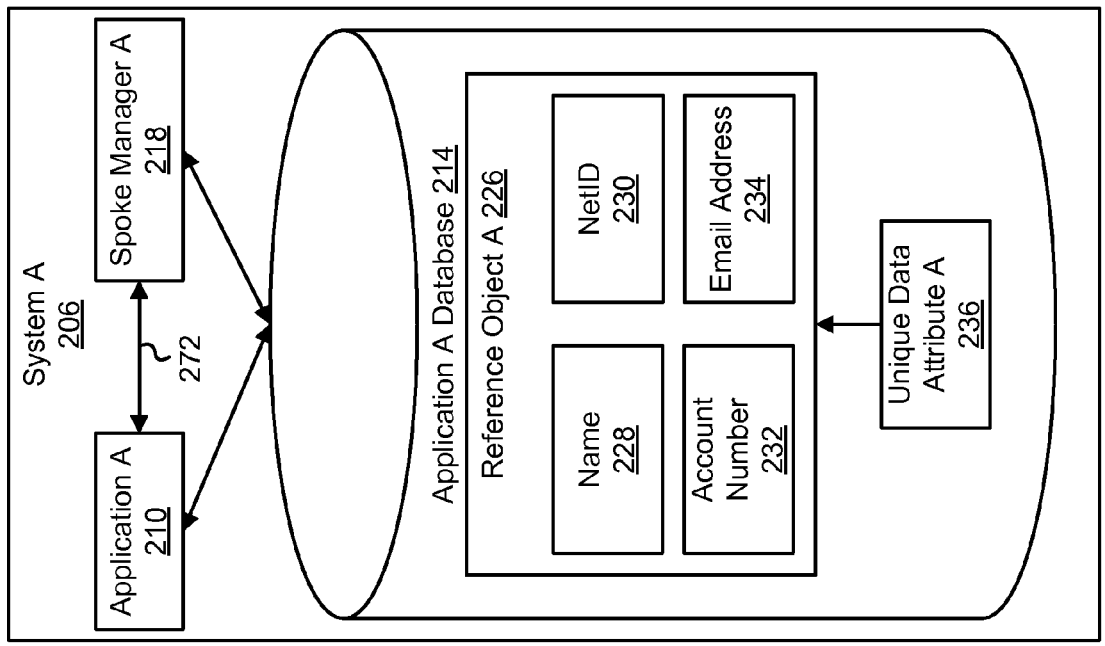
Fig. 3

SYSTEMS AND METHODS FOR RECEIVING AND SENDING MESSAGES ABOUT CHANGES TO DATA ATTRIBUTES

RELATED APPLICATIONS

This application is related to and claims priority from U.S. Provisional Patent Application Ser. No. 60/974,223 filed Sep. 21, 2007, for PRESENCEID SPOKE MANAGER ARCHITECTURE, with inventors Douglas Jock Walker and Reinier Van Ommeren, which is incorporated herein by reference.

TECHNICAL FIELD

The present invention relates generally to computers and computer-related technology. More specifically, the present invention relates to systems and methods for receiving and sending messages about changes to data attributes.

BACKGROUND

Computer and communication technologies continue to advance at a rapid pace. Indeed, computer and communication technologies are involved in many aspects of business operations. For example, a business may be located in numerous places with computers at each location. Computers may allow a business to maintain data relating to the business operations, customers, services, etc. Employees of a business may enter the data into the computers by utilizing business applications that run on the computers. Applications may also allow the employee to manage the data after it has been entered into the computer.

Data stored in a computer or a computer system is typically organized into a file, a database, or another type of data repository. It is not uncommon for an enterprise (e.g., corporation, small business, non-profit institution, government body, etc.) to have data stored in several different types of data repositories. There may be many reasons for this. For example, an enterprise may have inherited some data repositories as a result of mergers, acquisitions or the like with other enterprises. Alternatively, different departments within the same enterprise may have different needs which are best satisfied by different types of computer systems having different types of data repositories. The different data repositories maintained by an enterprise may be located in a variety of different computer systems, which may be dispersed around an office, around a campus, or even around the world.

An employee may utilize an application to enter data relating to the identity of a particular customer. For example, an employee may enter identity data such as the customer's name, date of birth, residential address, business address, network identification, social security number, account numbers, etc. A business may be more efficient by maintaining such identity data. For example, an employee is not required to enter identity data for a particular customer each time the customer interacts with the business because the data is already stored within the computers of the business.

Many businesses maintain many computer systems at various locations. A computer system at one location may differ from a computer system at another location. In particular, application, data and/or databases on one computer system may differ from application, data and/or databases on other computers. Often, data relating to the identity of a particular customer may change. For example, a customer may change residence and the residential address of the customer may need to be updated in the business computers. Because the business applications running on various computers may differ from each other, it may require a substantial amount of time and resources to ensure that changed identity data is updated on each business computer. As such, benefits may be realized by improved systems and methods for receiving and sending messages about changes to data attributes.

BRIEF DESCRIPTION OF THE DRAWINGS

FIG. 3 is a block diagram illustrating configurations of spoke systems with spoke managers;

DETAILED DESCRIPTION

Figure 1:
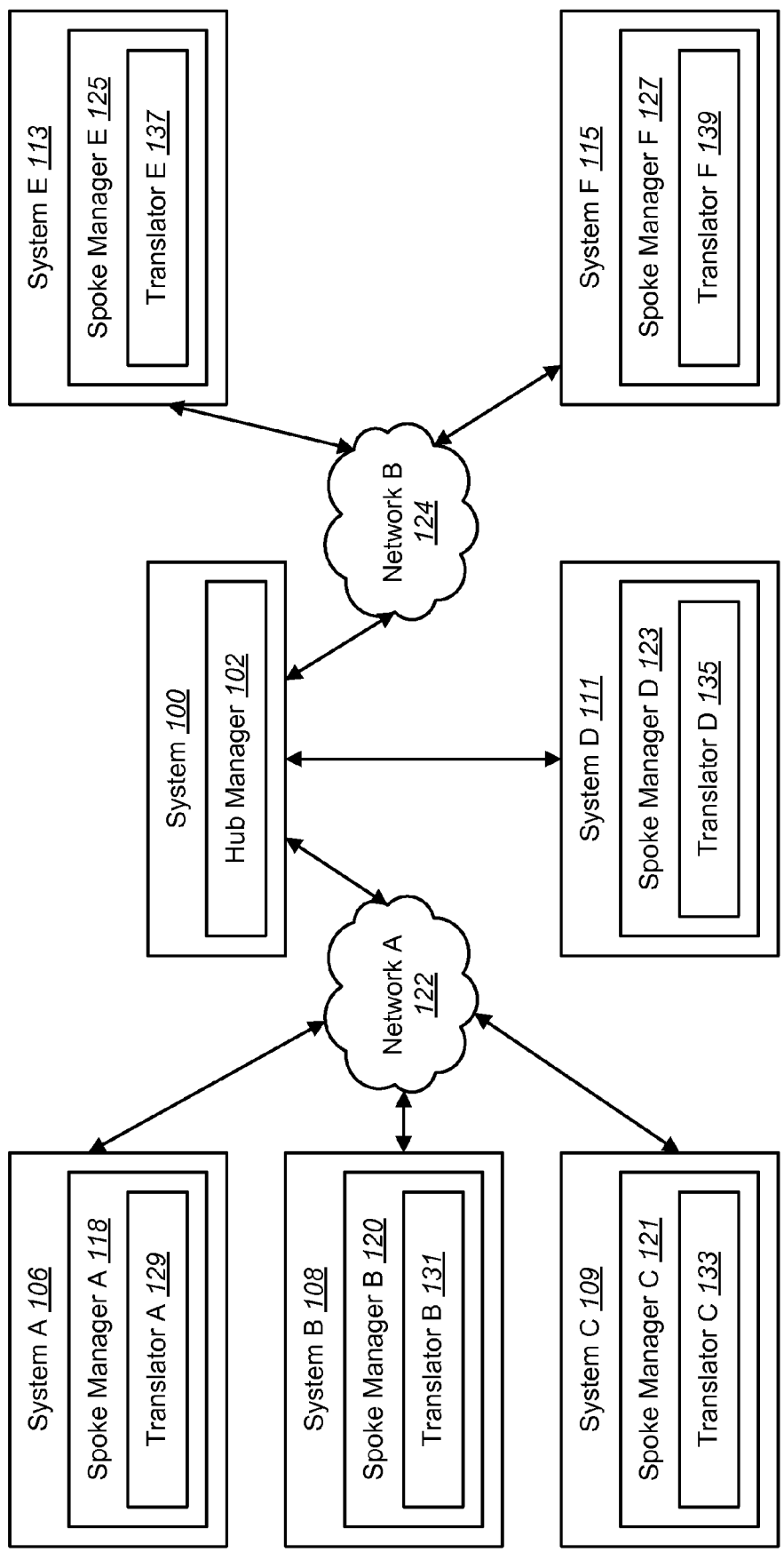
FIG. 1 is a block diagram illustrating one configuration of a hub system in communication with multiple spoke systems.

A method for receiving and sending messages about changes to data attributes is disclosed. A message is received that includes all common data attributes associated with a first reference object. The data attributes in the message are mapped to common data attributes in a second reference object. The type of the message is determined. The message is a synchronization message or a key change message. The common data attributes in the second reference object are updated to match the common data attributes in the first reference object if the message is a synchronization message. A unique data attribute in the second reference object is updated if the message is a key change message.

An acknowledgement message may be sent acknowledging receipt of the message. A completion message may be sent in response to updating the second reference object. Mapping may include determining how data from one schema can be copied into another schema.

Mapping may include standard data mapping. At least one common data attribute value in the second reference object may be identical to at least one common data attribute value in the first reference object.

Mapping may also include disjointed data mapping. At least one common data attribute value in the second reference object may not be identical to at least one common data attribute value in the first reference object.

Mapping may include static value mapping. At least one common data attribute value in the second reference object may be chosen from a predetermined list and may not be identical to at least one common data attribute value in the first reference object.

Mapping may further include using a table to identify an equivalent value for each of the at least one common data attribute value in the first reference object. The second reference object may include fewer common data attributes than the first reference object. The message may be received using the Simple Object Access Protocol (SOAP)

An apparatus for receiving and sending messages about changes to data attributes is disclosed. The apparatus includes a processor and memory in electronic communication with the processor. Executable instructions are stored in the memory. A message is received that includes all common data attributes associated with a first reference object. The data attributes in the message are mapped to common data attributes in a second reference object. The type of the message is determined. The message is a synchronization message or a key change message. The common data attributes in the second reference object are updated to match the common data attributes in the first reference object if the message is a synchronization message. A unique data attribute in the second reference object is updated if the message is a key change message.

A computer-readable medium for receiving and sending messages about changes to data attributes is disclosed. The computer readable medium comprises executable instructions. A message is received that includes all common data attributes associated with a first reference object. The data attributes in the message are mapped to common data attributes in a second reference object. The type of the message is determined. The message is a synchronization message or a key change message. The common data attributes in the second reference object are updated to match the common data attributes in the first reference object if the message is a synchronization message. A unique data attribute in the second reference object is updated if the message is a key change message.

Most business applications include two general types of data. The first may be transactional data. Examples of transactional data may include orders, shipments, invoices, payments, etc. Transactional data may utilize a high degree of control in order to maintain its integrity. This type of data may be managed by a single, highly integrated application, which may be highly dynamic or attended by a large volume of activity.

The second type of data may include identity data. Examples of identity data, or reference data, may include customers, employees, products, services, accounts, locations, etc. The terms "reference" and "identity," when describing data and objects, may be used interchangeably. While an important level of control may be utilized to maintain the integrity of identity data, it may be common for several business applications in an enterprise to maintain the same identity data. It may be beneficial if this type of data could be created, edited, changed, deleted, etc. by each individual business application. Further, it would be beneficial if each individual business application could share common data with the other business applications in the enterprise. For example, it may be beneficial if all of the systems in a business that deal with a certain customer could identify that customer in the same way.

Transactional data may be controlled by tightly-coupled data management techniques. For example, a change to an order amount may occur in the same database transaction that affects the inventory levels of the product. However, tightly-coupled application systems are more expensive to develop and maintain than loosely-coupled application systems.

Identity data generally doesn't require tightly-coupled data management techniques. Instead, this type of data can generally be handled with loosely-coupled data management techniques. A change to an individual's address in one application should be shared with all of the other applications within the business enterprise, but it may be acceptable if it takes several seconds or minutes to synchronize this changed data with the other applications.

The present systems and methods may enable a business enterprise to loosely-couple identity data with multiple business systems, applications and infrastructure using an asynchronous messaging system. This type of messaging system may guarantee delivery of identity change messages to each system and application within the business enterprise. Furthermore, the present systems and methods allow an application to complete a change to an attribute associated with identity data without affecting the normal operation of the application. The present systems and methods may operate in the background and send a message including information about the change to additional systems and applications within the business enterprise. When the additional applications are available, they may accept the message and process the change.

One of the benefits of the present systems and methods is that if any systems are unavailable for any reason (i.e. offline) the integrity of the identity data will not be jeopardized. The remaining systems that are available will continue to be synchronized and continue with accurate, updated data attributes.

Traditionally, systems and methods require data structures of the different applications to be identical or very similar. At the very least, the identity data typically has been required to share a common data attribute that uniquely identifies identity data. Such requirements have not enabled current systems and methods to be sufficiently loosely-coupled. Further, it is expensive for dissimilar applications to share identity data. Unlike other systems, the present systems and methods do not require identical, or even similar, attributes or data structures within different applications.

Synchronizing identity data between various systems is inherently difficult. Among the reasons for this are that different systems often use different data organization and automation schemes, and systems may not be coupled in any way. Part of the difficulty is that business process automation is an activity oriented process where various actions are performed on a variety of identities. Intelligently coupling activities with identities, and visa versa, in different systems is inherently difficult because the data models and methods used by identity systems and activity systems may be incompatible at multiple levels.

Utilizing identity as an organizing metaphor may provide a way to separate the activities from the identities. Information technology (IT) identities can be generally classified as users and resources. Examples of users may include people, applications, systems, and services, while examples of resources may include content, e.g., files, applications, systems, and services.

FIG. 1 is a block diagram illustrating one configuration of a hub system 100 in communication with multiple spoke systems. The system 100 may include a hub manager 102 that acts as a broker of identity data for all connected systems. Specifically, the hub system 100 may communicate with multiple spoke systems, such as systems A 106, B 108, C 109, D 111, E 113, and F 115. As used herein, the term "spoke system" may refer to a computing system with a spoke manager and may be used interchangeably with "system." The term "hub system" may refer to a computing system with a hub manager 102. These may be different computing systems relating to the same common enterprise. For example, a business may have multiple locations, each with spoke systems, and/or multiple spoke systems at the same location. There may also be more or less than the six spoke systems illustrated depending on the needs of an enterprise. Each spoke system may utilize the same identity data, such as customer records, that are necessary for their role within the enterprise, e.g., a human resources department may access the same customer record as an accounting department. Because identity data may be shared, it may be desirable to synchronize the data on each of spoke systems A 106, B 108, C 109, D 111, E 113, and F 115 with the data on the hub system 100. Therefore, the hub system 100 may communicate with spoke systems A 106, B 108, C 109, D 111, E 113, and F 115. This may be done over a network, such as network A 122 or network B 124. The network(s) 122, 124 may represent the Internet, one or more wide area networks (WANs), one or more local area networks (LANs), and so forth. The network(s) 122, 124 may be implemented using wired and/or wireless communication technologies and may use any available protocols to pass data between the hub system 100 and spoke systems A 106, B 108, C 109, E 113, and F 115. Alternatively, the hub system 100 may be connected directly to a spoke system, such as system D 111.

Each of spoke systems A 106, B 108, C 109, D 111, E 113, and F 115 may include a spoke manager, e.g., spoke managers A 118, B 120, C 121, D 123, E 125, and F 127, respectively. A spoke manager may be deployed for each spoke system within an enterprise and perform a number of operations, such as receiving messages from a hub manager 102, translating messages, updating identity data, and sending messages to a hub system 100. For example, each of spoke managers A 118, B 120, C 121, D 123, E 125, and F 127 may include a translator, e.g., translators A 129, B 131, C 133, D 135, E 137, F 139. A translator may change the format of a message received from the hub system 100 into a system specific format.

Spoke managers may communicate directly with the hub manager 102 and translate standard messages sent from the hub manager 102 to the system or application. Data translations or data transformations may include data mapping and data formatting. In one configuration, data mapping identifies the location of specific required data in one system and application and "maps" it to a location of data with the same attributes of another system and application. In one configuration, data formatting defines a physical format of the data.

In one configuration, spoke managers may be deployed to each spoke system and application within a business enterprise and may be very specific to the particular business system or application on which it resides. This type of distributed architecture distributes the complexity of maintaining reference objects across an enterprise, where each spoke manager may communicate with a hub manager 102. In one configuration, adding additional systems or applications does not require changes to the hub manager 102 because the spoke manager provides the translation of data formats between the systems and applications and the hub manager 102. This may allow business systems and applications to be deployed on a variety of technology platforms, data management tools and application development environments.

When a hub manager 102 sends a change message it may contain all of the information about a reference object, rather than just the changes. This means that the receiving spoke manager and its source system may have enough contextual information to translate differences in data structures, keys, application technologies, and business rules. At the same time, the spoke manager may translate any differences and synchronize the data with the source system internal data structures. The spoke manager will be described in more detail in the description of FIG. 6.

Figure 2:
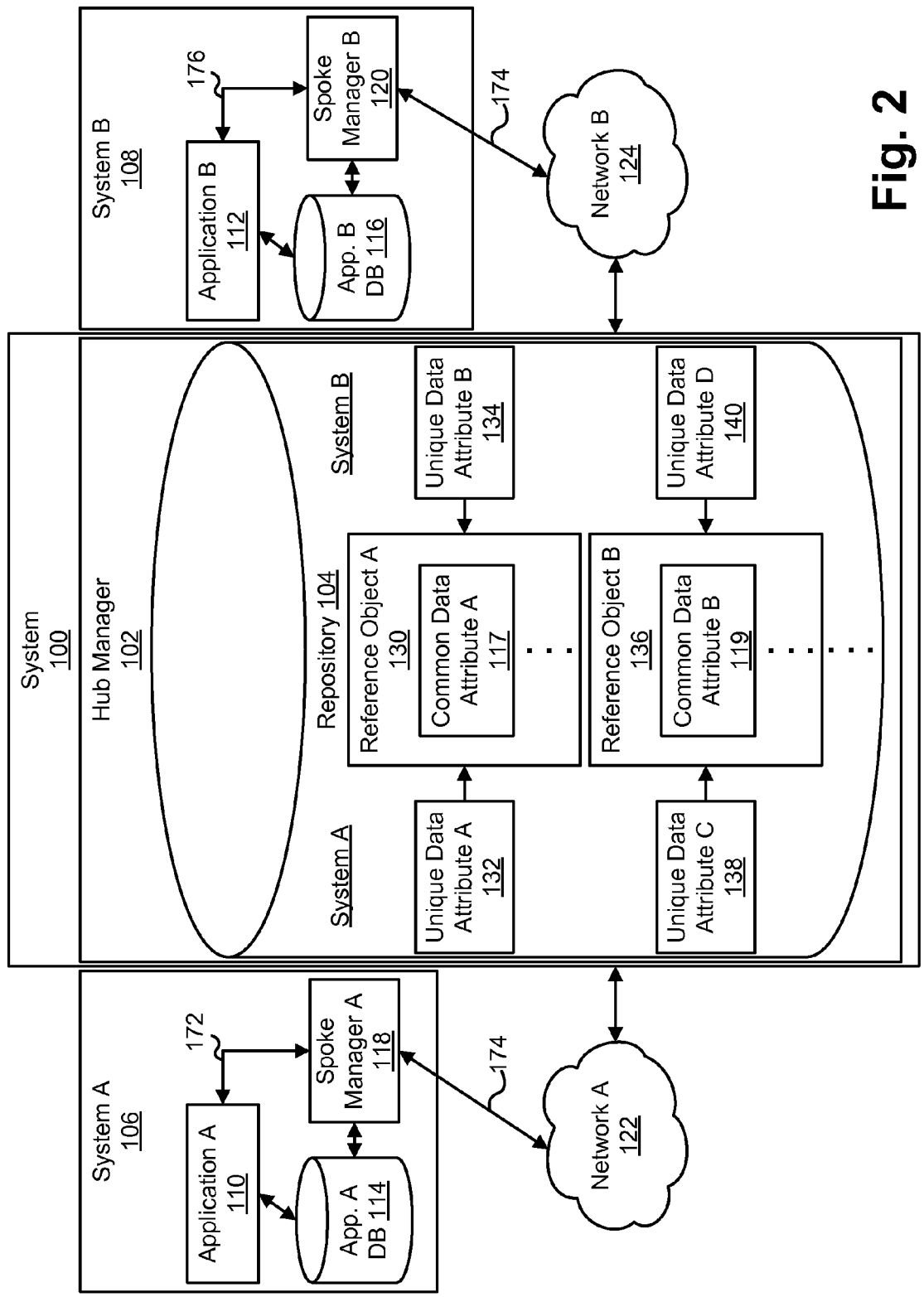
FIG. 2 is a block diagram illustrating another configuration of a hub system in communication with spoke systems.

FIG. 2 is a block diagram illustrating another configuration of a hub system 100 in communication with spoke system A 106 and spoke system B 108. Although FIG. 2 only depicts the hub system 100 in communication with the two spoke systems 106, 108, it is to be understood that the hub system 100 may be in communication with more than two spoke systems. For example, numerous spoke systems may be connected in a star configuration with the hub system 100 at the center. In some configurations the different systems 100, 106, 108 may be located in different geographic regions across a country and/or across the world. In other configurations the different systems 100, 106, 108 may be located within the same facility.

Spoke system A 106 and spoke system B 108 may include any type of computing device such as a personal computer, laptop, personal digital assistant (PDA), computer server, etc. Spoke systems A 106 and B 108 may include application A 110 and application B 112, respectively. Applications A 110 and B 112 may include software that employs the capabilities of systems A 106 and B 108 to execute a task. In one configuration, applications A 110 and B 112 may utilize different data structures. Different data structures may be suited to different types of applications, such as applications A 110 and B 112.

Spoke systems A 106 and B 108 may also include application A database 114 and application B database 116, respectively. The databases 114, 116 may include a stored collection of data that may be accessed by applications A 110 and B 112. In one configuration, spoke systems A and B 106, 108 may also include spoke manager A 118 and spoke manager B 120, respectively. Spoke managers A and B 118, 120 may send/receive data to/from applications A and B 110, 112, respectively. In addition, spoke managers A and B 118, 120 may send/receive data to/from application A database 114 and application B database 116, respectively. In one configuration, spoke manager A 118 sends/receives data to/from application A 110 in a first format 172. In another configuration, spoke manager B 120 sends/receives data to/from application B 112 in a second format 176. The first format 172 may be different from the second format 176. Spoke manager A 118 may also send/receive data to/from the system 100. In one configuration, spoke manager A 118 sends/receives data to/from the system 100 in a third format 174. In another configuration, spoke manager B 120 also sends/receives data to/from the hub system 100 in the third format 174.

Spoke managers A and B 118, 120 may communicate with the hub system 100 over network A 122 and network B 124, respectively. While the illustrated configuration only illustrates two networks, it is to be understood that the system 100 may communicate with any number of systems over any number of networks. In one configuration, the system 100 includes a hub manager 102. The hub manager 102 may act as a broker of identity data included in reference objects for the various systems and applications. For example, the hub manager 102 may send/receive messages to/from the various systems and applications. Business systems and applications, such as spoke system A 106, may change identity data in a database, such as application A database 114, and send a message about these changes to the hub manager 102. The hub manager 102 may then send a message to other spoke systems and applications that utilize this identity data, such as spoke system B 108. In this way, the present systems and methods may guarantee that messages with updated identity data are sent to all connected business systems and applications that utilize any shared, or common, attribute.

In one configuration, the hub manager 102 may include a repository 104. The repository 104 may store data included within the various systems communicating with the hub system 100, such as spoke systems A and B 106, 108. In one configuration, repository 104 may include a plurality of reference objects, such as reference object A 130 and reference object B 136. Reference object A and B 130, 136 may be a record of data relating to the identity of an individual, product, etc. For example, reference object A 130 may be an employee record and reference object B 136 may be a customer record. Each reference object may include common data attributes. Reference object A 130 may include common data attributes A 117 and reference object B 136 may include common data attributes B 119. Common data attributes may include data that is shared between systems, such as spoke system A 106 and spoke system B 108. An example of a common data attribute may include the name of the entity being identified by the reference object. Further examples of common data attributes may include an address, date of birth, email address, etc.

Spoke manager A 118 and spoke manager B 120 may implement a unique data attribute to uniquely identify each reference object. For example, spoke manager A 118 may implement unique data attribute A 132 and spoke manager B 120 may implement unique data attribute B 134 to identify reference object A 130. Similarly, spoke manager A 118 may implement unique data attribute C 138 and spoke manager B 120 may implement unique data attribute D 140 to uniquely identify reference object B 136. In one configuration, the repository is aware of each unique data attribute and the value of such attribute that each spoke manager implements to identify a particular reference object. The following scenario may further illustrate this concept.

A human resource system of a business may implement the unique data attribute of "Employee_id" to uniquely identify the reference object of an employee record of the employee associated with the employee identification indicated by "Employee_id". An accounting system of the same business may use the unique data attribute of "Employee_tax_id" to uniquely identify the employee record of an employee. For purposes of illustration, the "Employee_id" may be "789" and the "Employee_tax_id" may be "A52". The employee record may include one or more common data attributes, such as name, address, date of birth, etc. In one configuration, the employee with the "Employee_id" of "789" may change his/her address through an application on the human resource system. The accounting system may not be able to be updated with the new address because the accounting system identifies employee records with a different data attribute (i.e., "Employee_tax_id").

In one configuration, the repository 104 stores the employee's information such that the hub manager is aware that the employee identification is "789" and the employee tax identification is "A52". The repository 104 may translate a message associated with "Employee_id=789" that is updating a common data attribute to a message that includes "Employee_tax_id=A52" before the message is sent to the accounting system.

In this configuration, the hub manager 102 is aware of which unique data attribute (and its value) each spoke manager uses to uniquely identify a reference object. The hub manager 102 is also aware of each of the plurality of reference objects that a particular enterprise may use (i.e., employee records, customer records, product record, etc.). Further, the hub manager 102 is aware of each common data attribute included with each reference object. The repository 104 associates each reference object with the unique data attribute each spoke manager uses to uniquely identify the reference object.

FIG. 3 is a block diagram illustrating configurations of spoke systems 206, 208 with spoke managers 218, 220. As illustrated, spoke manager A 218 may send/receive data to/from application A 210 using a first data format 272. Spoke manager B 220 may send/receive data to/from application B 212 using a second data format 276. Applications A and B 210, 212 may obtain data from application A database 214 and application B database 216, respectively. In one configuration, spoke manager A 218 may communicate directly with application A database 214 and spoke manager B 220 may communicate directly with application B database 216.

Application A database 214 and application B database 216 may include one or more reference objects, such as reference object A 226. Reference object A 226 may identify a particular type of entity that is associated with one or more common data attributes. For example, reference object A 226 may identify customers, employees, business entities, products, services, accounts, locations, etc. In one configuration, reference object A 226 may include common data attributes relating to the entity identified by reference object A 226. In the depicted configuration, the reference object A 226 identifies a customer and may include common data attributes further relating to the identity of the customer. It is to be understood that additional reference objects may include common data attributes that further relate to the identity of other entities in addition to customers. In one configuration, reference object A 226 includes common data attributes such as name 228, NetID 230, account number 232 and email address 234. While only four examples of common data attributes are listed, it is to be understood that reference object A 226 may include other common data attributes. For example, common data attributes may include date of birth, residential address, business address, social security number, account numbers, etc.

Spoke manager A 218 and spoke manager B 220 may each uniquely identify the reference object A 226 with a different unique data attribute. For example, spoke manager A 218 may identify reference object A 226 using unique data attribute A 236 while spoke manager B 220 identifies reference object A 226 using unique data attribute B 238.

In addition, application A 210 and application B 212 may use different common data attributes of reference object A 226. For example, application A 210 may use the common attributes of name 228, NetID 230, account number 232 and email address 234. Application B may use the common data attributes of data of birth 252, address 254 and telephone number 256.

Figure 4:
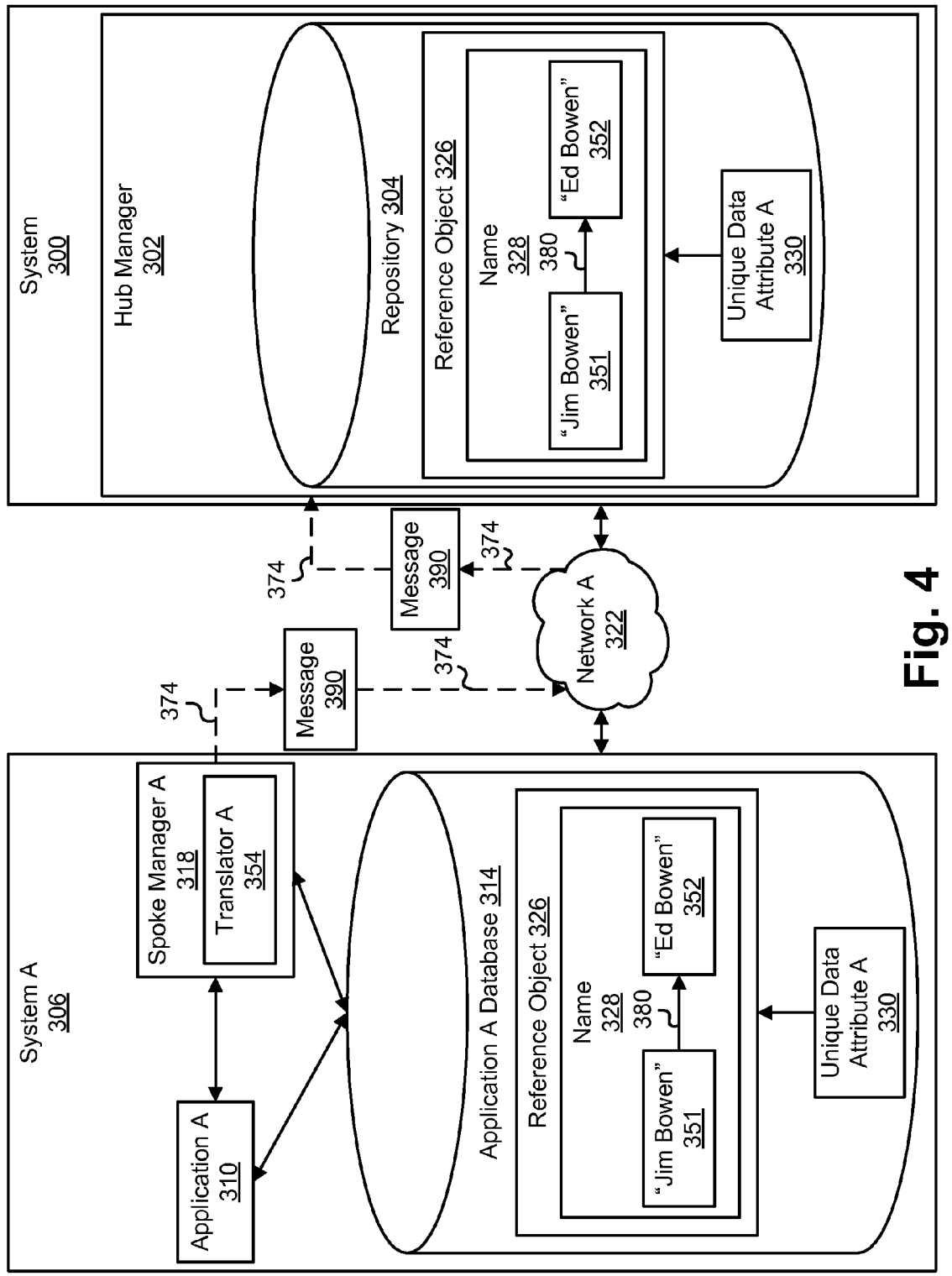
FIG. 4 is a block diagram illustrating one configuration of a spoke manager sending a message to a hub manager.

FIG. 4 is a block diagram illustrating one configuration of spoke manager A 318 sending a message 390 to a hub manager 302. While only spoke system A 306 is illustrated with spoke manager A 318 communicating with the hub manager 302, it is to be understood that additional spoke systems and spoke managers may communicate with the hub manager 302 in a similar manner as explained below. In one configuration, spoke system A 306 communicates with a hub system 300 over network A 322. Application A 310 and spoke manager A 318 may be included within system A 306. In one configuration, application A 310 facilitates a customer to provide data associated with common data attributes. For example, the customer, using application A 310, may provide the name "Ed Bowen" 352. Application A 310 may communicate the name "Ed Bowen" 352 to application A database 314. Application A database 314 may store the name "Ed Bowen" 352. In one configuration, the name "Ed Bowen" 352 is associated with the common data attribute of name 328. The name attribute 328, as previously explained, may be included as a common data attribute of a reference object 326. In this example, the reference object 326 may be a customer record that identifies a particular customer.

In one configuration, application A database 314 may have previously stored the name "Jim Bowen" 351. When application A 310 communicates the name "Ed Bowen" 352 to application A database 314, the value "Jim Bowen" 351 may be changed 380 to the value "Ed Bowen" 352. This scenario may illustrate the situation where the first name entered, "Jim Bowen", was incorrect and should have been "Ed Bowen." In this configuration, the common data attribute of name 328 is changed.

In one configuration, spoke manager A 318 may send a message 390 including the change in the common attribute of name 328 to the hub manager 302. In an additional configuration, the message 390 may include all the common data attributes included with the reference object 326. For example, the reference object 326 may include several common data attributes, such as email, NetID, address etc. A change to any common data attribute, such as name may cause a synchronization message 390 to be sent which includes all of the common data attributes of the reference object 326. In other words, the message 390 may include common data attributes that have not been modified. In the illustrated example, the hub manager 302 detects from the synchronization message that a common data attribute of the reference object 326 has changed.

Spoke manager A 318 may gather all the common data attributes of the reference object 326 and perform data translations if necessary. Spoke manager A 318 may package the message 390 in a first data format 374. In one configuration, spoke manager A 318 includes translator A 354 which facilitates the translation of the reference object 326 if necessary. The message 390 may be in the form of a simple record that includes unique data attribute A 330. Unique data attribute A 330 may be used by spoke manager A 318 to uniquely identify the reference object 326. Spoke manager A 318 may send the message 390 to the hub manager 302 over network A 322. Changes to common data attributes associated with the reference object 326 may be communicated to the hub manager 302. In a further configuration, application A 310 updates reference information by writing a queue record in application A database 314. Spoke manager A 318 may monitor the database 314 and take action based on the queue records in the database 314. In another configuration, application A 310 may not include an application programming interface (API) that spoke manager A 318 may work with. In this instance, spoke manager A 318 may access data directly from application A database 314.

In the illustrated example, the hub manager 302 may detect from the synchronization message 390 that a common data attribute of the reference object 326 has changed. In one configuration, the hub manager 302 may define a packet of information for the reference object 326 which includes all the common data attributes of the reference object 326. The packet of information included in the hub manager 302 may be a superset of data from each system and application that uses the reference object 326. In one configuration, the hub manager 302 maintains a repository 304 with the reference object 326 and each of the common data attributes of the reference object 326. In addition, as previously explained, the repository 304 includes the unique data attributes used by each spoke manager to identify the reference object 326.

In one configuration, the hub manager 302 may receive the message 390 which includes unique data attribute A 330. The hub manager 302 may be aware that spoke manager A 318 uses unique data attribute A 330 to identify the reference object 326. The hub manager 302 may processes the message 390 in order to update the common data attributes associated with the reference object 326 stored in the repository 304. For example, the common data attribute of name 328 may be changed 380 from "Jim Bowen" 351 to "Ed Bowen" 352.

Note that although FIG. 4 illustrates a message 390 being sent from the spoke manager 318 to the hub system 300, the hub system 300 may also send messages to one or more spoke managers 318. This will be described in further detail below.

Figure 5:
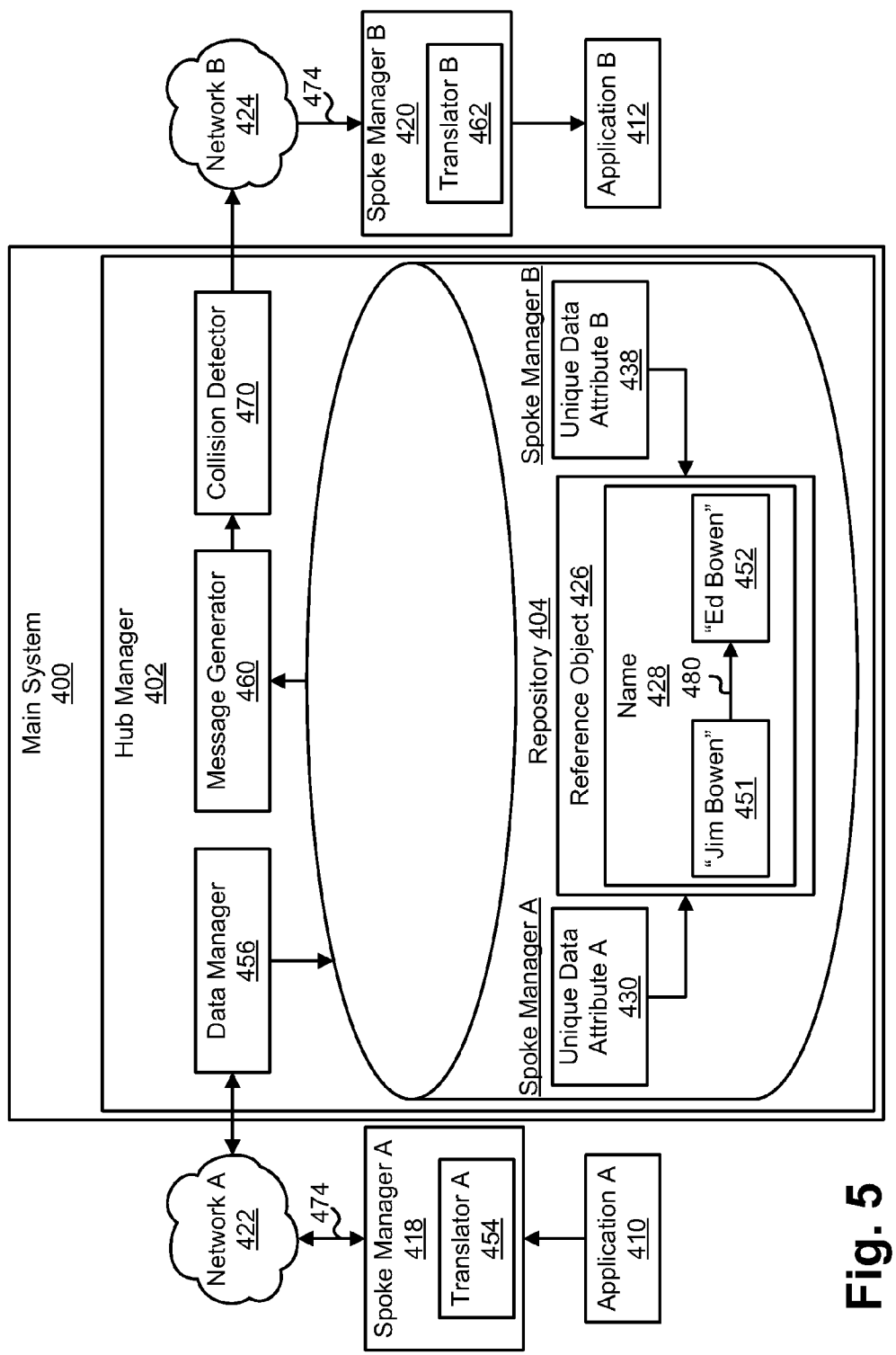
FIG. 5 is a block diagram illustrating one configuration of a hub manager sending a synchronization message to additional spoke managers.

FIG. 5 is a block diagram illustrating one configuration of a hub manager 402 of main system 400 sending a synchronization message to additional spoke managers. In one configuration, spoke manager A 418 may build a message in a first data format 474. Application A 410 is also present. Translator A 454 may be used to format the message in the first data format 474. In other words, each spoke manager may send/receive messages to/from the hub manager 402 in a single format per reference object. The message may include all the common data attributes associated with the reference object stored in application A database (not shown). The first data format 474 may indicate the unique data attribute being used by spoke manager A to uniquely identify the reference object 426.

Spoke manager A 418 may send the message in the first data format 474 to a data manager 456 over network A 422. In one configuration, the data manager 456 is included within a hub manager 402. In one configuration, spoke manager A 418 may require additional information in order to build the message. Additional information may be retrieved from the hub manager 402 in order to build a complete message. For example, the additional information may be retrieved through synchronous web services messages. In one configuration, the data manager 456 receives requests from spoke manager A 418 for the web services.

The hub manager 402 processes the message and determines which reference object is identified from the unique data attribute included in the message. In this example, the message includes unique data attribute A 430 which identifies the reference object 426. In one configuration, the common data attribute of name 428 included in the reference object 426 is changed 480 from "Jim Bowen" 451 to "Ed Bowen" 452. The reference object 426 stored in the repository 404 may be updated with the changed common data attribute included in the message.

A message generator 460 may generate a synchronization message that includes updates to any of the common data attributes of the reference object 426. A collision detector 470 may be used before the hub manager sends synchronization messages to other spoke systems to notify them of any updates to common data attributes. The collision detector 470 detects the most recent synchronization message for a given reference object and only allows the most current messages generated by the message generator 460 to be sent to additional spoke managers. Collision detection occurs when a particular spoke system is synchronized on a scheduled time interval as opposed to an on-demand synchronization. In one configuration, the hub manager 402 is aware which spoke managers are configured for a scheduled synchronization and when that is to occur. Synchronization messages may be placed in a cue between scheduled synchronization events and only the most recent messages are sent and the others are discarded at that time. The collision detector 470 verifies that only the most accurate common data attributes are included on each reference object in every spoke system that needs that particular common data attribute.

The synchronization message may be sent to application B 412, through spoke manager B 420. Network B 424 is also present. Because the hub manager 402 is aware that spoke manager B 420 uses unique data attribute B 438 to identify reference object 426, the message may include unique data attribute B 438. Spoke manager B 420 may receive the message in the first data format 474 (with unique data attribute B 438). In one configuration, translator B 462 translates the message to a format which may be used by application B 412 or application B database. In one configuration, the message may be a series of messages/requests depending on the API of application B 412. Spoke manager B 420 may communicate directly with application B database if application B 412 does not allow a public API. Spoke manager B 420 translates the message, becomes aware that the message pertains to common data attributes of the reference object 426 (because of unique data attribute B 438). The message includes all the common data attributes associated with the reference object 426. Spoke manager B 420 determines which common data attributes are applicable to the reference object used by application B 412. In other words, spoke manager B 420 may ignore some of the common data attributes in the message if they do not pertain to application B.

In some configurations, a unique data attribute may be changed. For example, referring to the previous example, the human resource system may change the employee tax identification for an employee from "A52" to "B46". In this example, the "Employee_tax_id" is used by the spoke manager B 420 to uniquely identify the employee record. The hub manager 402 may generate a key change message if the unique data attribute used by another spoke manger is altered.

Figure 6:
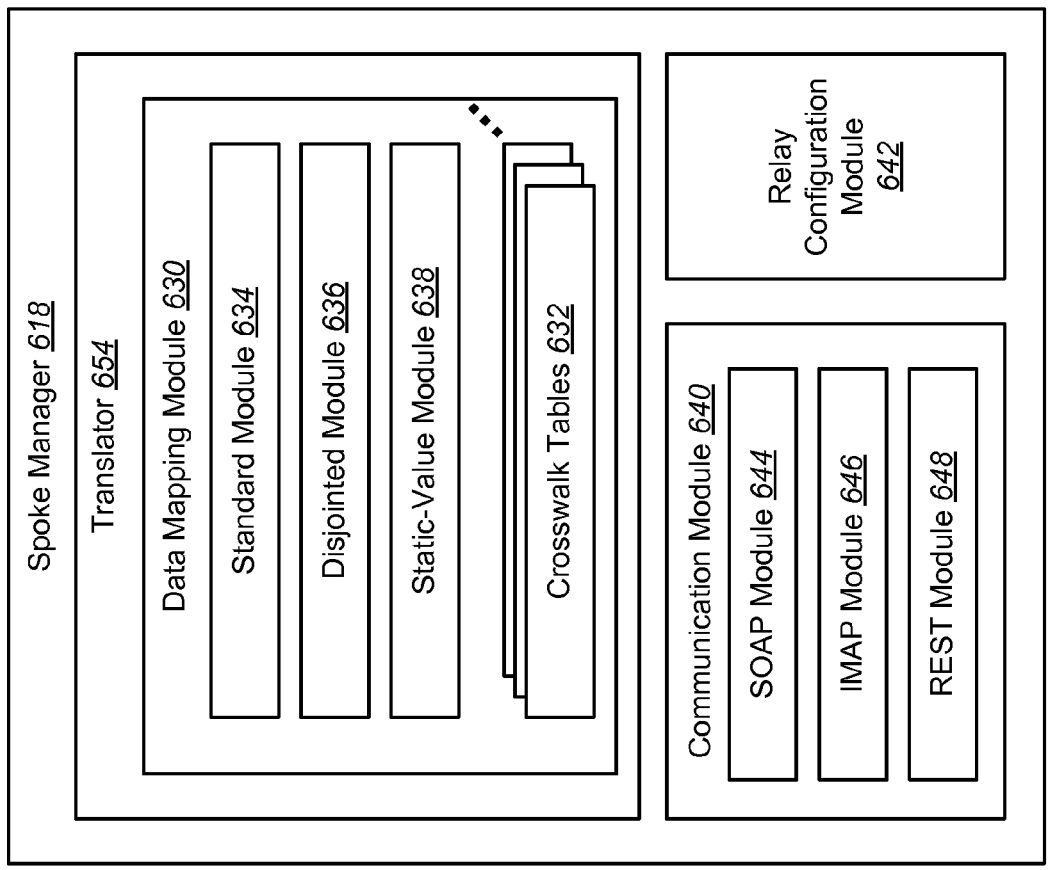
FIG. 6 is a block diagram of one configuration of a spoke manager.

FIG. 6 is a block diagram of one configuration of a spoke manager 618. The spoke manager 618 may be implemented in each spoke system and may perform a number of operations. The spoke manager 618 may include a translator 654, a communication module 640, and a relay configuration module 642. The translator 654 may include a data mapping module 630 and crosswalk tables 632, which may be used to map and merge identity data sent or referenced in a message 390 from a hub manager 302. Data mapping and merging may be the process of determining how data from one data schema may be copied into a different data schema. In other words, the translator 654 may use data mapping to determine how to change the identity data, or reference object 326, residing in the application database 326. For example, a synchronization message 390 indicating a change to identity data, e.g., a reference object 326, may be received by the spoke manager 618 within spoke system A 306 from the hub manager 302 in the hub system 300. Mapping may then be used to determine which common data attribute(s) in the reference object 326 residing in the application database 314 correlate with the common data attribute(s) changed in the hub manager 302.

The data mapping module 630 may include a standard module 634 to perform standard data mapping, a disjointed module 636 to perform disjointed data mapping, and a static value module 638 to perform static value mapping. The type of mapping performed by the data mapping module 630 may depend on the correlation of the data in the hub manager 302 to the data in system A 306.

If the identity data in the hub manager 302 is identical to the identity data in spoke system A 306, the standard module 634 may use standard mapping. In this case, mapping between systems may be a very simple process of identifying which data attributes are equivalent. Following the previous example, if the "name" attribute 328 of a reference object 326 is changed on the hub manager 302, a message 390 may be generated on the hub manager 302. This may be a packet of information including all of the common data attributes about the reference object 326, which may be a superset of all the common data attributes of the reference object 326 residing on any of the systems in the enterprise. Upon generating this message 390, the hub manager 302 may then send the message 390 to spoke system A 306. If the data attributes of reference object 326 on the hub manager 302 are identical to the data attributes of the reference object 326 on spoke system A 306, then the standard data mapping module 634 may use standard data mapping to map the common attribute values of the reference object 326 on system A to the common attribute values of the reference object on the hub manager 302. In other words, if the attribute value on the hub manager 302 was changed from "Jim Bowen" 351 to "Ed Bowen" 352 and the reference object 326 on spoke system A 306 includes a common attribute value "Jim Bowen" 328, the value of "Jim Bowen" in spoke system A 306 may be changed to the value of "Ed Bowen" in spoke system A 306. This is the process of standard mapping and may be performed when the identity data attributes in one source are identical to the identity data attributes in another source, e.g., both the spoke system 306 and the hub system 300 have/had a name attribute with a value "Jim Bowen" 328.

However, when an identity attribute value in the hub manager 302 is not identical to an identity attribute value in spoke system A 306, the disjointed module 636 may use disjointed data mapping. For example, when a single attribute in a source, like the hub system 300, is a first and a last name, and a single attribute in another source, like spoke system A 306, is only a first name, disjointed data may be used. In the previous example, if the "name" attribute 428 value on the hub manager 302 was changed from "Jim Bowen" 451 to "Ed Bowen" 452, but the "name" attribute on system A 306 was represented by two attributes, instead of one, e.g., a "first name" attribute and a "last name" attribute, then disjointed mapping may be used since the identity attribute value on the two sources are not identical to one another. Disjointed mapping may include a Java application programming interface (API) or a set of XPath functions that performs some specific operation on the identity data. Additionally, disjointed mapping may include custom code that performs some specific transformation such as performing a mathematical calculation, joining multiple fields into one or more other fields, or adding additional data retrieved from one or more other source systems.

Furthermore, when certain identity attributes are "static," the static value module 638 may perform static value mapping. As used herein, the term "static" refers to attributes for which there is a pre-defined list of possible values. This may be the case where two different attribute values are syntactically different, but represent the same data. One example may be if the reference object 326 in spoke system A 306 included an identity attribute for a geographic location, such as "state" and the value of state was spelled out entirely, while the reference object 326 in another system, such as system 300 or system B 208, included an identity attribute "state" but used the two letter abbreviation for the value. These two values would not be identical, however, they would represent the same data. In this case, the static value module 638 may utilize one or more crosswalk tables 632 to ensure that the differing values for common attributes are mapped appropriately. The crosswalk tables may create a unique identifier ("state" in the above example) that may communicate the appropriate value to each system, e.g., "Utah" and "UT." The crosswalk tables may be present on both the hub manager 302 and all the spoke managers A 118, B 120, C 121, D 123, E 125, and F 127.

Additionally, a relay configuration module 642 may format data appropriately for any given system. As described earlier, each spoke system may have different format requirements than each other and the hub system 300. Furthermore, to provide scalability to an enterprise, the hub system 300 may not be constantly updated for each new spoke system added to the enterprise. Therefore, each spoke manager 318 may be required to format a message from another spoke system or the hub system 300 to fit the needs of the spoke system on which it resides. To do this, each piece of identity data may be accessed via an application programming interface (API), a data access protocol (such as JDBC, SQL, or LDAP), or directly from the application database 314. The relay configuration module 642 may be unique and customized for each spoke manager 618 and the system 306 it operates on. For example, the relay configuration module 642 may format an outgoing message 390 being sent to a hub manager 302 when a reference object is changed on system A 306.

Furthermore, the spoke manager 618 may utilize a publish and subscribe model, like those often implemented in service oriented architectures. In other words, the spoke manager 618 may be unaware of receivers of the messages it publishes, such as systems B 120, C 121, D 123, E 125, and F 127. For example, spoke system A 318 may be unaware of any other spoke systems that may ultimately receive a message 390 that it sends, or publishes. Therefore, the spoke manager 618 may publish a message to the hub manager 302, which may then decide which other systems should receive the message. This model is used to exchange data between the hub manager 302 and system A 306 via spoke managers 618 to synchronize identity data. Various messages 390 may be passed between the hub manager 302 and the spoke manager 618. Examples of messages 390 include, without limitation, synchronization messages when common data attributes are changed, key change messages when unique data attributes are changed, acknowledgements, completion codes, and requests for information.

The spoke manager 618 may also include a communication module 640. One of the advantages of the present systems and methods is the way in which standard web services transport, security, and message formats are utilized, which are often associated with communication activities, e.g., Hypertext Transfer Protocol (HTTP), Secure Sockets Layer (SSL), and Simple Object Access Protocol (SOAP). These protocols may be used to reliably implement identity data synchronization in a service-oriented architecture (SOA) in the communications module 640 in the following manner.

The SOAP module 644 may be used by the spoke manager 618 to communicate with the hub manager 302. Both the spoke manager 618 and the hub manager 602 may use the SOAP module 644. The module 644 may encode an XML message in a HTTP packet and guarantee its accurate transmission from the spoke manager 618 to the hub manager 302, or vice versa.

Additionally, the communication module 640 may utilize other communication methodologies and protocols across an enterprise. For example the Internet Message Access Protocol (IMAP) module 646 may use IMAP, and the Representational State Transfer (REST) module 648 may use the REST method, to read information included in Extensible Markup Language (XML) files that are asynchronously passed between spoke managers 618 and hub managers 302.

Figure 7:
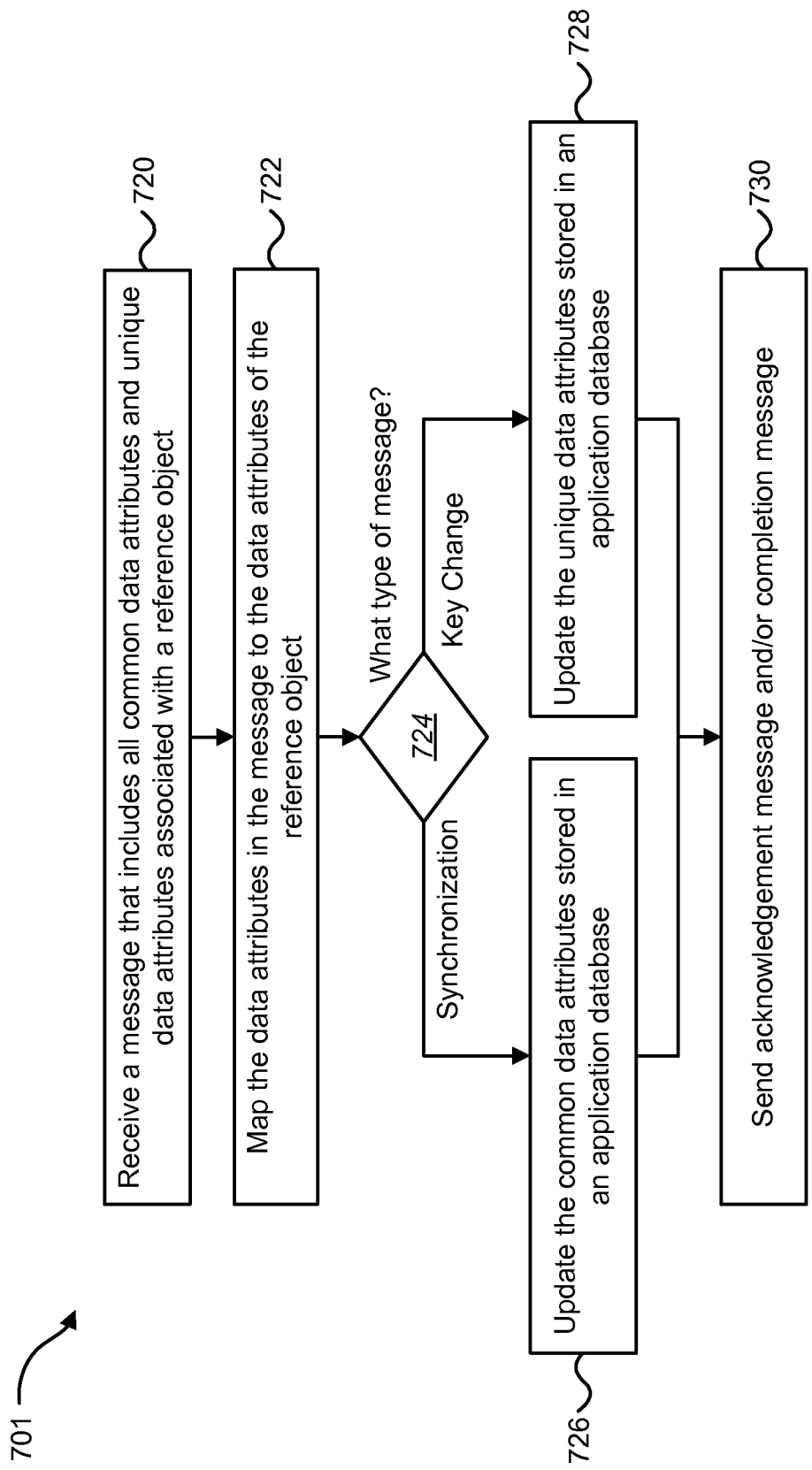
FIG. 7 is a flow diagram illustrating a method for updating identity information on a spoke system.

FIG. 7 is a flow diagram illustrating a method 701 for updating identity information on a spoke system 306. First, a spoke manager 318 may receive 720 a message 390 that includes all common data attributes and unique data attributes associated with a reference object 326. This message 390 may have been generated by a hub manager 302 and may be a synchronization message or a key change message. Note that the message 390 may include all common data attributes, not merely the attributes used by the spoke system 306. In other words, the message 390 may include a superset of identity attributes used by a particular spoke system. This may allow the spoke manager 318 to then map 722 the data attributes in the message to the data attributes of the reference object stored on the spoke system 306. This mapping 722 may include standard mapping of identical attributes, disjointed mapping of different attributes using Java, XPath, or custom code, or static value mapping of static values using crosswalk tables. The spoke manager 318 may then determine 724 whether the message 390 is a synchronization message or a key change message. If the message 390 is a synchronization message, the spoke manager 318 may update 726 the common data attributes of a reference object 326 stored in an application database 314. If the message 390 is a key change message, the spoke manager 318 may update 728 the unique data attributes of a reference object 326 stored in an application database 314. Lastly, the spoke manager 318 may send 730 an acknowledgement message and/or completion message. This may be done only in response to a request by the hub manager 302 that the spoke manager 318 send an acknowledgement message and/or completion message. The spoke manager 318 may utilize SOAP, IMAP, and/or REST to send these messages.

Figure 8:
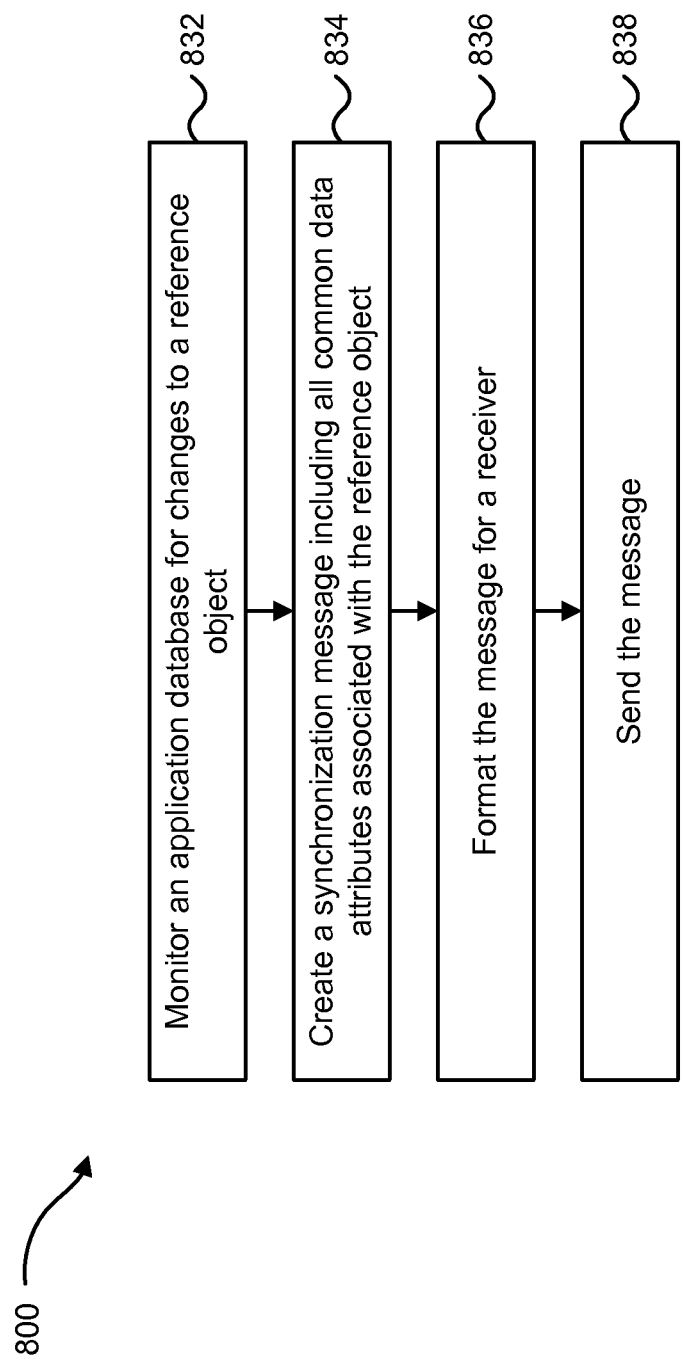
FIG. 8 is a flow diagram illustrating a method for sending a synchronization message from a spoke system.

FIG. 8 is a flow diagram illustrating a method 800 for sending a synchronization message from a spoke system 306. Initially, a spoke manager 318 may monitor 832 an application database 314 for any changes to a reference object 326. These changes may include changes to a common data attribute, such as a name attribute 328, or to a unique data attribute 330. The spoke manager 318 may then create 834 a synchronization message including all common data attributes associated with the reference object 326. Next, the spoke manager 318 may format 836 the message for a receiver, such as a hub manager 302. This formatting may be done by a relay configuration module 642, which may access the data via an application programming interface (API), a data access protocol (such as JDBC, SQL, or LDAP), or directly from the application database 314. Lastly, the spoke manager 318 may send 838 the message.

Figure 9:
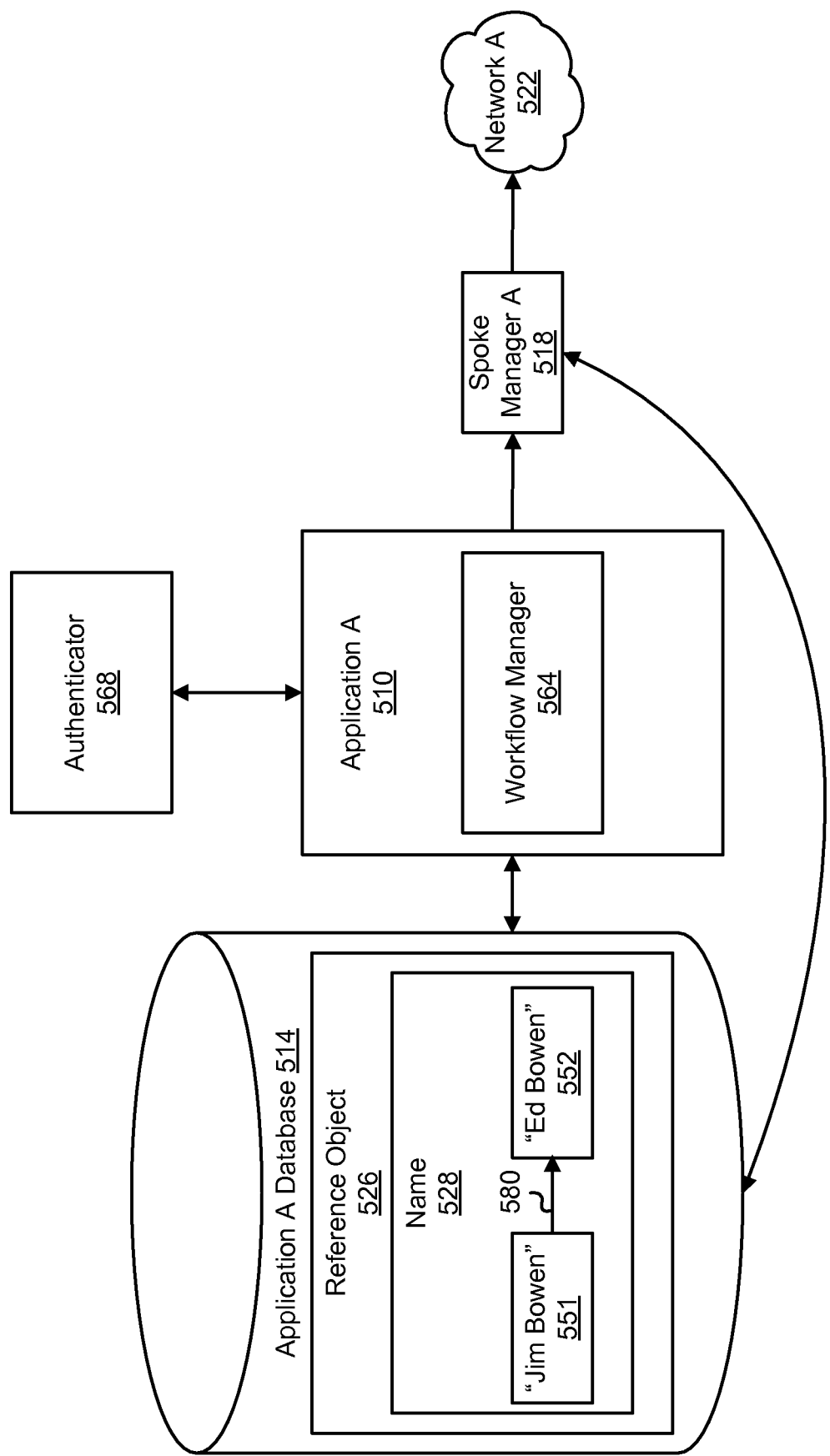
FIG. 9 is a block diagram illustrating one configuration of a potential change in a common data attribute being authenticated.

FIG. 9 is a block diagram illustrating one configuration of a potential change in a common data attribute being authenticated. Application A database 514 may include a reference object 526 as previously explained. In one configuration, the common data attribute of name 528 may be changed 580 from "Jim Bowen" 551 to "Ed Bowen" 552.

In one configuration, application A 510 may access application A database 514 and store a queue record if changes to common data attributes have occurred. Application A 510, and the spoke system including application A 510 (such as system A 106), may include native built-in workflow capabilities. In one configuration, application A 510 may include a workflow manager 564 to manage these workflow capabilities. Spoke manager A 518 may monitor application A database 514 for a queue record. If a queue record is detected by spoke manager A 518, spoke manager A 518 may package a synchronization message that includes all of the common data attributes of the reference object 526 and sends the message to a hub manager. In a further configuration, spoke manager A 518 may gather all the common data attributes of the reference object by making requests of application A 510 through an API or by accessing application A database 514 directly if there is no API available.

In one configuration, a notification may be communicated to an authenticator 568 when a queue record is stored in application A database 514. The authenticator 568 may include a system administrator who may accept or reject the storage of the queue record. In another configuration, the authenticator 568 may include computer software that automatically accepts or rejects the queue record according to certain parameters determined by the system administrator. For example, the system administrator may program the software to accept changes relating to the common data attribute of name 528 and reject any changes to the common data attribute of account number 232. If the queue record is rejected, spoke manager A 518 may not build a message to send to a hub manager over network A 522.

Figure 10:
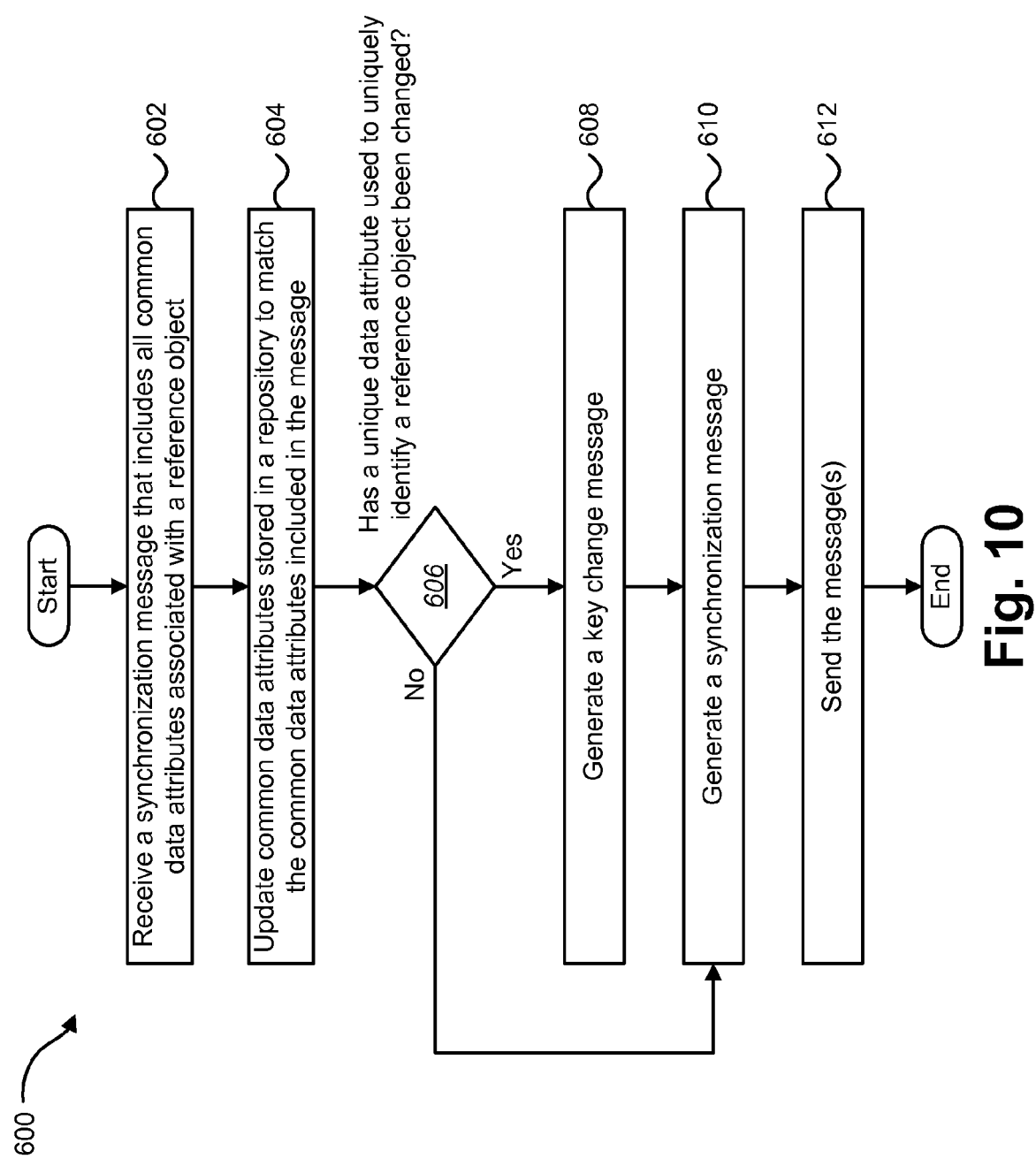
FIG. 10 is a flow diagram illustrating one configuration of a method for notifying multiple systems and applications of changes to common data attributes.

FIG. 10 is a flow diagram illustrating one configuration of a method 600 for notifying multiple systems and applications of changes to common data attributes. In one configuration, the method 600 may be implemented by the hub manager 102. The method 600 may follow the method of FIG. 8. In other words, the method in FIG. 8 may end with a spoke manager 318 sending a message to a hub manager 302, which may be the synchronization message received at the beginning of this method 600. A synchronization message that includes all common data attributes of a reference object may be received 602. In one configuration, the data manager 456 receives 602 the message. Common data attributes that may be stored in a repository 304 of the hub manager 302 may be updated 604 to be synchronized with the common data attributes included in the message. A determination 606 is made as to whether a unique data attribute used by a spoke manager 318 to uniquely identify a reference object 326 has been changed. If it is determined 606 that a unique data attribute is being updated, a key change message may be generated 608. In one configuration, the key change message is queued up and addressed to the spoke manager(s) that use the unique data attribute to identify the reference object 326. If it is determined 606 that there is no unique data attribute being updated, a synchronization message may be generated 610. The synchronization message (and possibly the key change message) may be sent 612 to one or more spoke systems.

The message may include all the common data attributes associated with the reference object. The message may also include the unique data attribute used by the receiving spoke manager to uniquely identify the reference object. In one configuration, the receiving spoke manager has sufficient contextual information to translate for differences in data structures, keys, application technologies and business rules. In a further configuration, the receiving spoke manager 318 may translate any differences and synchronize the data with its internal data structures.

Figure 11:
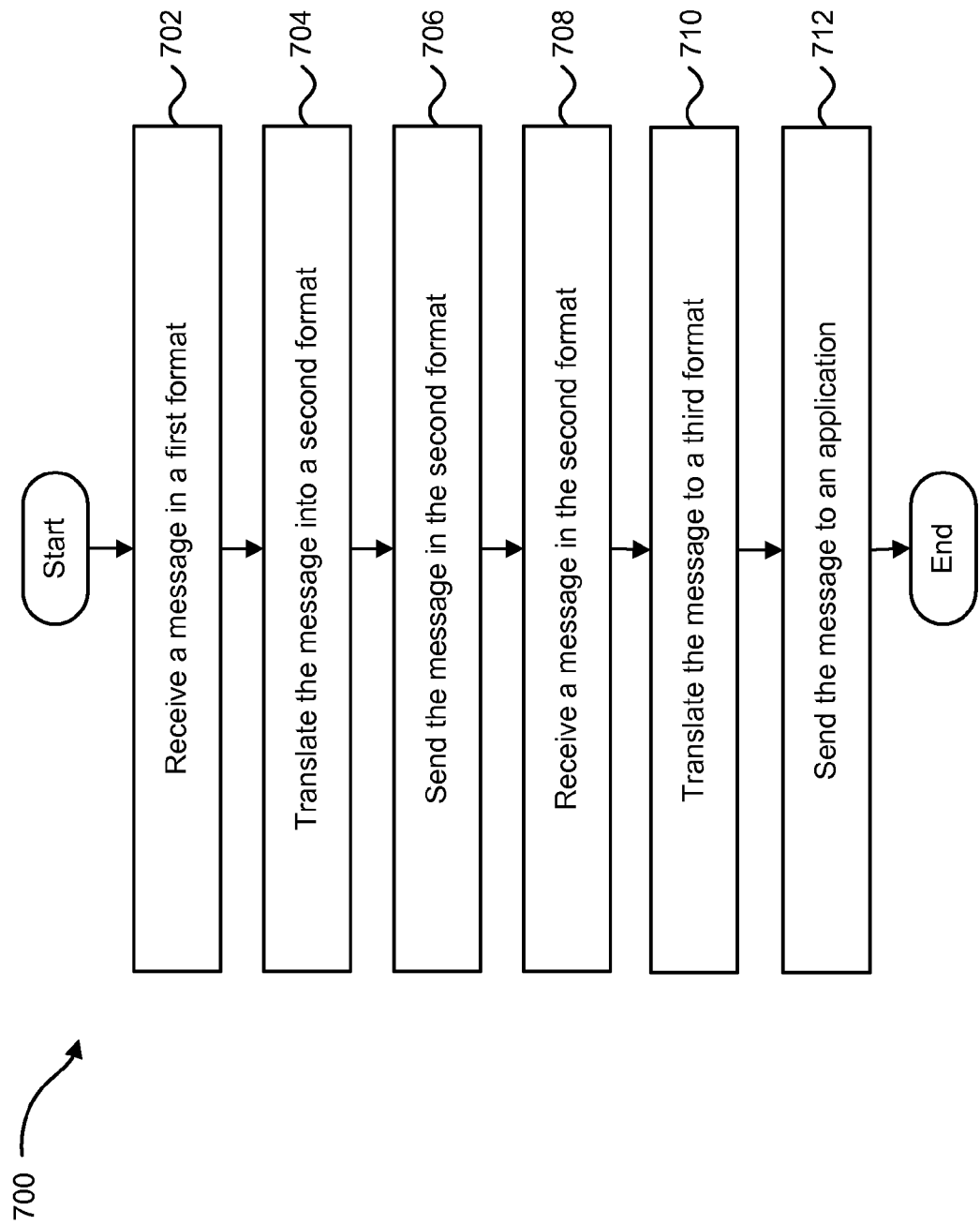
FIG. 11 is a flow diagram illustrating one configuration of a method for translating a message into a specific format.

FIG. 11 is a flow diagram illustrating one configuration of a method 700 for translating a message into a specific format. In one configuration, a spoke manager 618 may implement the method 700. The message may be received 702 in a first format. In one configuration, the first format may be a format specific to a particular system or application. The message may be translated 704 into a second format. In one configuration, a translator 654 included in the spoke manager 618 may translate 704 the message into the second format. The message may be sent 706 in the second format. In one configuration, the message may be sent to the hub manager 102 in the second format. The second format may include a format specific to the hub manager 102.

In one configuration, a message may be received 708 in the second format. In one configuration, the message may be received 708 from the hub manager 102. The message may be translated 710 to a third format. In one configuration, the third format may be a format specific to a particular system and application. The message may be sent 712 to the system and application that is specific to the third format.

Figure 12:
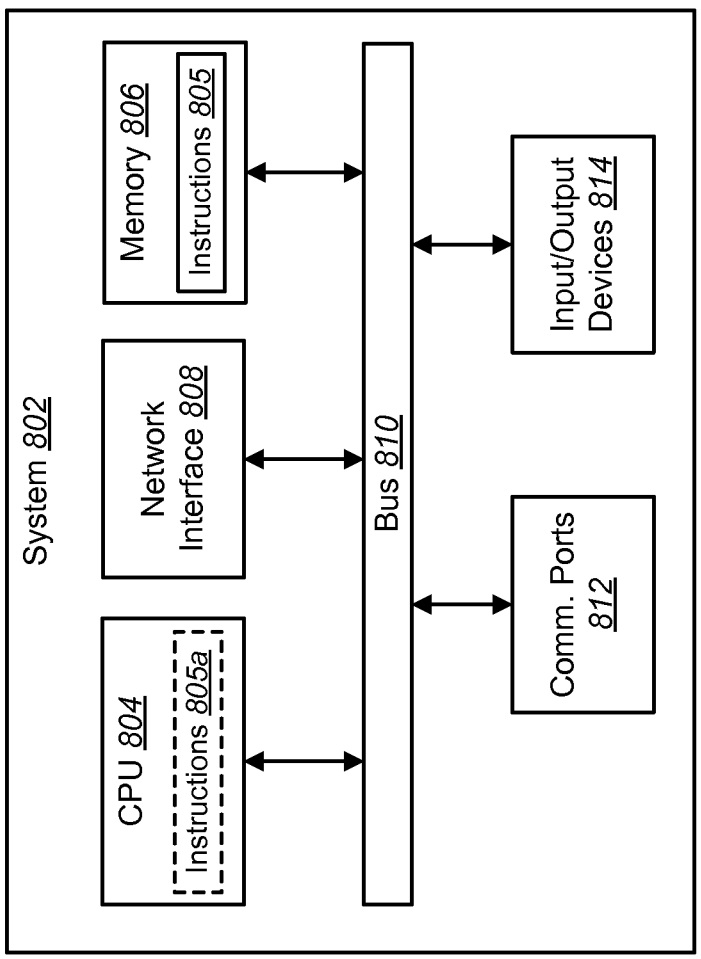
FIG. 12 is a block diagram of hardware components that may be used in a system that is configured according to one configuration.

FIG. 12 is a block diagram of hardware components that may be used in a system 802 that is configured according to one configuration. A central processing unit (CPU) 804 or processor may be provided to control the operation of the system 802, including the other components thereof, which are coupled to the CPU 804 via a bus 810. The CPU 804 may be embodied as a microprocessor, microcontroller, digital signal processor or other device known in the art. The CPU 804 performs logical and arithmetic operations based on program code stored within the memory. In certain configurations, the memory 806 may be on-board memory included with the CPU 804. For example, microcontrollers often include a certain amount of on-board memory.

The system 802 may also include a network interface 808. The network interface 808 facilitates communication between the system 802 and other devices connected to a network, which may be a pager network, a cellular network, a global communications network, the Internet, a computer network, a telephone network, etc. The network interface 808 operates according to standard protocols for the applicable network.

The system 802 may also include memory 806. The memory 806 may include random access memory (RAM) for storing temporary data. Alternatively, or in addition, the memory 806 may include read-only memory (ROM) for storing more permanent data, such as fixed code and configuration data. The memory 806 may also be embodied as a magnetic storage device, such as a hard disk drive. The memory 806 may be any type of electronic device capable of storing electronic information. The memory 806 may include instructions 805 executable to implement the systems and methods described herein. Alternatively, or in addition to, the CPU 804 may include executable instructions 805*a*. For example, the CPU 804 may load instructions 805*a* before execution.

The system 802 may also include one or more communication ports 812, which facilitate communication with other devices. The system 802 may also include input/output devices 814, such as a keyboard, a mouse, a joystick, a touchscreen, a monitor, speakers, a printer, etc.

Of course, FIG. 12 illustrates only one possible configuration of a system 802. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for receiving and sending messages about changes to data attributes, comprising:
   receiving, by a computing device comprising a processor and memory, a message that includes all common data attributes associated with a first reference object and a unique data attribute associated with the first reference object, wherein the message includes all common data attributes;
   mapping, by the computing device, the data attributes in the message to common data attributes in a second reference object, wherein the mapping comprises determining how data from one schema can be copied into another schema;
   determining, by the computing device, whether the message is a synchronization message or a key change message
   updating, by the computing device, the common data attributes in the second reference object to match the common data attributes in the first reference object if the message is a synchronization message;
   updating, by the computing device, a unique data attribute in the second reference object if the message is a key change message;
   sending an acknowledgement message acknowledging receipt of the message; and
   sending a completion message in response to updating the second reference object, wherein the acknowledgement message and the completion message are sent only in response to a request that is received by the computing device,
   wherein the computing device further comprises a queue record that indicates that a change has been made to a common data attribute in the first reference object, wherein the change in the queue record is accepted or rejected by an authenticator that has been programmed to accept or reject the queue record based upon the common data attribute in the first reference object being a particular common data attribute that is being changed.

2. The method of claim 1, wherein the mapping comprises standard data mapping, and wherein at least one common data attribute value in the second reference object is identical to at least one common data attribute value in the first reference object.

3. The method of claim 1, wherein the mapping comprises disjointed data mapping, and wherein at least one common data attribute value in the second reference object is not identical to at least one common data attribute value in the first reference object.

4. The method of claim 1, wherein the mapping comprises static value mapping, and wherein at least one common data attribute value in the second reference object is chosen from a predetermined list and is not identical to at least one common data attribute value in the first reference object.

5. The method of claim 4, wherein the mapping further comprises using a table to identify an equivalent value for each of the at least one common data attribute value in the first reference object.

6. The method of claim 1, wherein the second reference object comprises fewer common data attributes than the first reference object.

7. The method of claim 6, wherein the message is received using the Simple Object Access Protocol (SOAP).

8. The method of claim 7, wherein a message indicating the change will be constructed if the queue record is accepted but will not be constructed if the queue record is rejected.

9. An apparatus for receiving and sending messages about changes to data attributes, comprising:
    a processor;
    memory in electronic communication with the processor;
    instructions stored in the memory, the instructions being executable by the processor to:
        receive a message that includes all common data attributes associated with a first reference object and a unique data attribute associated with the first reference object, wherein the message includes all common data attributes;
        map the data attributes in the message to common data attributes in a second reference object, wherein the instructions for mapping are further executable to determine how data from one schema can be copied into another schema;
        determine whether the message is a synchronization message or a key change message;
        update the common data attributes in the second reference object to match the common data attributes in the first reference object if the message is a synchronization message;
        update a unique data attribute in the second reference object if the message is a key change message;
        send an acknowledgement message acknowledging receipt of the message; and
        send a completion message in response to updating the second reference object, wherein the acknowledgement message and the completion message are sent only in response to a request that is received,
    wherein the instructions are further executable by the processor to form a queue record that indicates that a change has been made to a common data attribute in the first reference object, wherein the change in the queue record is accepted or rejected by an authenticator that has been programmed to accept or reject the queue record based upon the common data attribute in the first reference object being a particular common data attribute that is being changed.

10. The apparatus of claim 9, wherein the instructions for mapping are further executable to perform standard data mapping, and wherein at least one common data attribute value in the second reference object is identical to at least one common data attribute value in the first reference object.

11. The apparatus of claim 9, wherein the instructions for mapping are further executable to perform disjointed data mapping, and wherein at least one common data attribute value in the second reference object is not identical to at least one common data attribute value in the first reference object.

12. The apparatus of claim 9, wherein the instructions for mapping are further executable to perform static value mapping, and wherein at least one common data attribute value in the second reference object is chosen from a predetermined list and is not identical to at least one common data attribute value in the first reference object.

13. The apparatus of claim 12, wherein the instructions for mapping are further executable to use a table to identify an equivalent value for each of the at least one common data attribute value in the first reference object.

14. The apparatus of claim 9, wherein the second reference object comprises fewer common data attributes than the first reference object.

15. The apparatus of claim 9, wherein the instructions for receiving are further executable to receive using the Simple Object Access Protocol (SOAP).

16. A non-transitory computer-readable medium for receiving and sending messages about changes to data attributes, the computer readable medium comprising executable instructions for:
    receiving a message that includes all common data attributes associated with a first reference object and a unique data attribute associated with the first reference object, wherein the message includes all common data attributes;
    mapping the data attributes in the message to common data attributes in a second reference object, wherein the mapping comprises determining how data from one schema can be copied into another schema;
    determining whether the message is a synchronization message or a key change message;
    updating the common data attributes in the second reference object to match the common data attributes in the first reference object if the message is a synchronization message;
    updating a unique data attribute in the second reference object if the message is a key change message;
    sending an acknowledgement message acknowledging receipt of the message; and
    sending a completion message in response to updating the second reference object, wherein the acknowledgement message and the completion message are sent only in response to a request that is received,
    wherein the computer readable medium further comprises instructions for forming a queue record that indicates that a change has been made to a common data attribute in the first reference object, wherein the change in the queue record is accepted or rejected by an authenticator that has been programmed to accept or reject the queue record based upon the common data attribute in the first reference object being a particular common data attribute that is being changed.

* * * * *